(12) United States Patent
Sato

(10) Patent No.: US 10,749,415 B2
(45) Date of Patent: Aug. 18, 2020

(54) MOTOR DEVICE

(71) Applicant: JTEKT CORPORATION, Osaka-shi, Osaka (JP)

(72) Inventor: Yuto Sato, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 63 days.

(21) Appl. No.: 16/100,664

(22) Filed: Aug. 10, 2018

(65) Prior Publication Data

US 2019/0068030 A1    Feb. 28, 2019

(30) Foreign Application Priority Data

Aug. 25, 2017    (JP) .................................. 2017-162447

(51) Int. Cl.
*H02K 11/33* (2016.01)
*H02K 9/22* (2006.01)
*H02K 11/215* (2016.01)

(52) U.S. Cl.
CPC ............... *H02K 11/33* (2016.01); *H02K 9/22* (2013.01); *H02K 11/215* (2016.01); *H02K 2213/06* (2013.01)

(58) Field of Classification Search
CPC ........ H02K 11/00; H02K 11/22; H02K 11/33; H02K 9/00; H02K 9/22; B62D 5/0406; H05K 1/0263; H05K 1/144
See application file for complete search history.

(56) References Cited

U.S. PATENT DOCUMENTS

2011/0285223 A1* 11/2011 Miyachi et al. ....... H02K 11/33
310/64

FOREIGN PATENT DOCUMENTS

| EP | 1799018 A2 | 6/2007 |
| EP | 3062425 A1 | 8/2016 |
| EP | 3109979 A1 | 12/2016 |
| JP | 2015-180155 A | 10/2015 |

OTHER PUBLICATIONS

Jan. 23, 2019 Extended Search Report issued in European Patent Application No. 18190157.0.

* cited by examiner

*Primary Examiner* — Tran N Nguyen
(74) *Attorney, Agent, or Firm* — Oliff PLC

(57) ABSTRACT

Provided is a motor device that prevents an increase in size in the radial direction of a motor while providing redundancy in controlling driving of the motor. A motor device includes: a motor including a motor shaft; a first control board on which a first power circuit and a first control circuit are mounted in combination, and a second control board on which a second power circuit and a second control circuit are mounted in combination, as control boards constructing a circuit that controls driving of the motor; and a housing that accommodates the motor and the control boards together. Each of the control boards is disposed to cross a radial direction that is orthogonal to an axial direction of the motor.

12 Claims, 4 Drawing Sheets

MOTOR DEVICE

INCORPORATION BY REFERENCE

The disclosure of Japanese Patent Application No. 2017-162447 filed on Aug. 25, 2017 including the specification, drawings and abstract, is incorporated herein by reference in its entirety.

BACKGROUND OF THE INVENTION

1. Field of the Invention

The invention relates to a motor device.

2. Description of Related Art

For example, Japanese Patent Application Publication No. 2015-180155 (JP 2015-180155 A) discloses a motor device integrally including a motor having a motor shaft, and a control board that controls driving of the motor. In the motor device disclosed in JP 2015-180155 A, the motor and the control board are accommodated together in a housing, while a portion of the control board extends out from the outer peripheral side of the motor.

To construct a circuit that controls driving of a motor, a power circuit that operates to supply electric power required to drive the motor and a control circuit that controls operations of the power circuit are mounted on the control board. In the case where the number of circuits that need to be mounted on the control board in order to provide redundancy in controlling driving of the motor is increased, the portion of the control board extending out of the outer peripheral side of the motor is increased to secure the space for mounting the circuits. In this case, the size of the motor device in the radial direction of the motor is increased.

SUMMARY OF THE INVENTION

An object of the present invention is to provide a motor device that prevents an increase in size in the radial direction of a motor while providing redundancy in controlling driving of the motor.

A motor device according to an aspect of the present invention includes: a motor including a motor shaft; a plurality of control boards each having a power circuit that operates to supply electric power required to drive the motor, and a control circuit that controls operations of the power circuit, to construct a circuit that controls driving of the motor; and a housing that accommodates the motor and the control boards together; wherein each of the control boards is disposed to cross a radial direction that is orthogonal to an axial direction of the motor.

According to the above aspect, since the control boards are provided each having both a power circuit and a control circuit, it is possible to provide redundancy in controlling driving of the motor. In this case, the degree of freedom in arrangement is increased compared to the case where a plurality of power circuits and a plurality of control circuits are mounted on a single control board, so that the arrangement that prevents an increase in size in the radial direction of the motor can be considered. Further, as a result of considering the arrangement of the control boards, each of the control boards is disposed to cross the radial direction that is orthogonal to the axial direction of the motor. Therefore, compared to the case where the control boards are disposed to be aligned with the radial direction of the motor, the effect of preventing an increase in size in the radial direction of the motor can be obtained. Accordingly, it is possible to prevent an increase in the size of the motor device in the radial direction of the motor while providing redundancy in controlling driving of the motor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A motor device according to an embodiment of the present invention will be described below. The motor device according to the present embodiment is designed to be mounted on an electric power steering system for a vehicle, and to generate torque that assists the steering operation of the driver.

Figure 1:
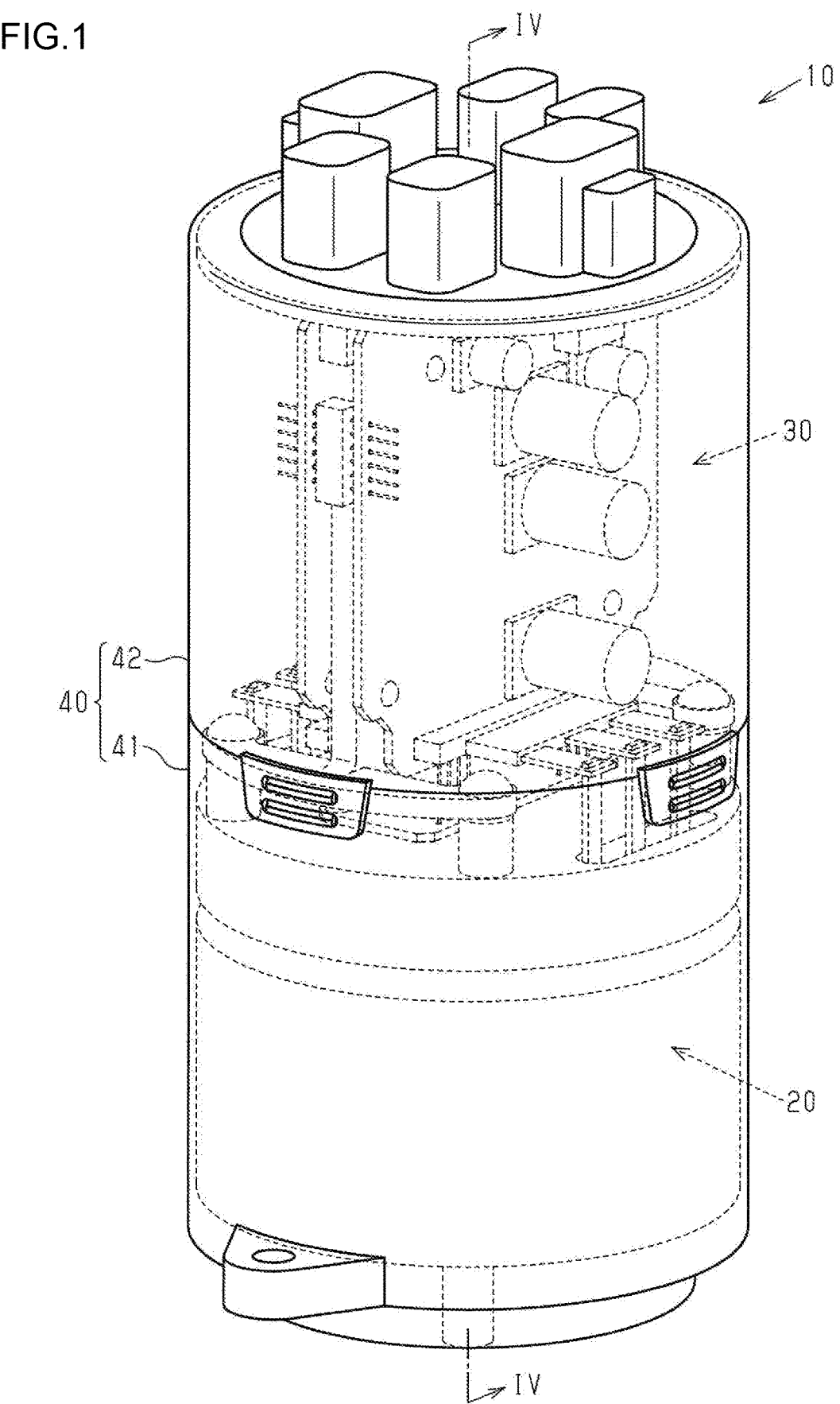
FIG. 1 is a perspective view illustrating the general configuration of a motor device.

As illustrated in FIG. 1, in a motor device 10 according to the present embodiment, a motor 20 having a motor shaft 22 and a controller 30 that controls driving of the motor 20 are accommodated together in the housing 40, and thus are integrated with each other. The housing 40 has a bottomed cylindrical shape. The housing 40 is formed by assembling a motor housing 41 made of a metal material such as aluminum, and a housing cover 42 made of a resin material such as synthetic resin.

Figure 2:
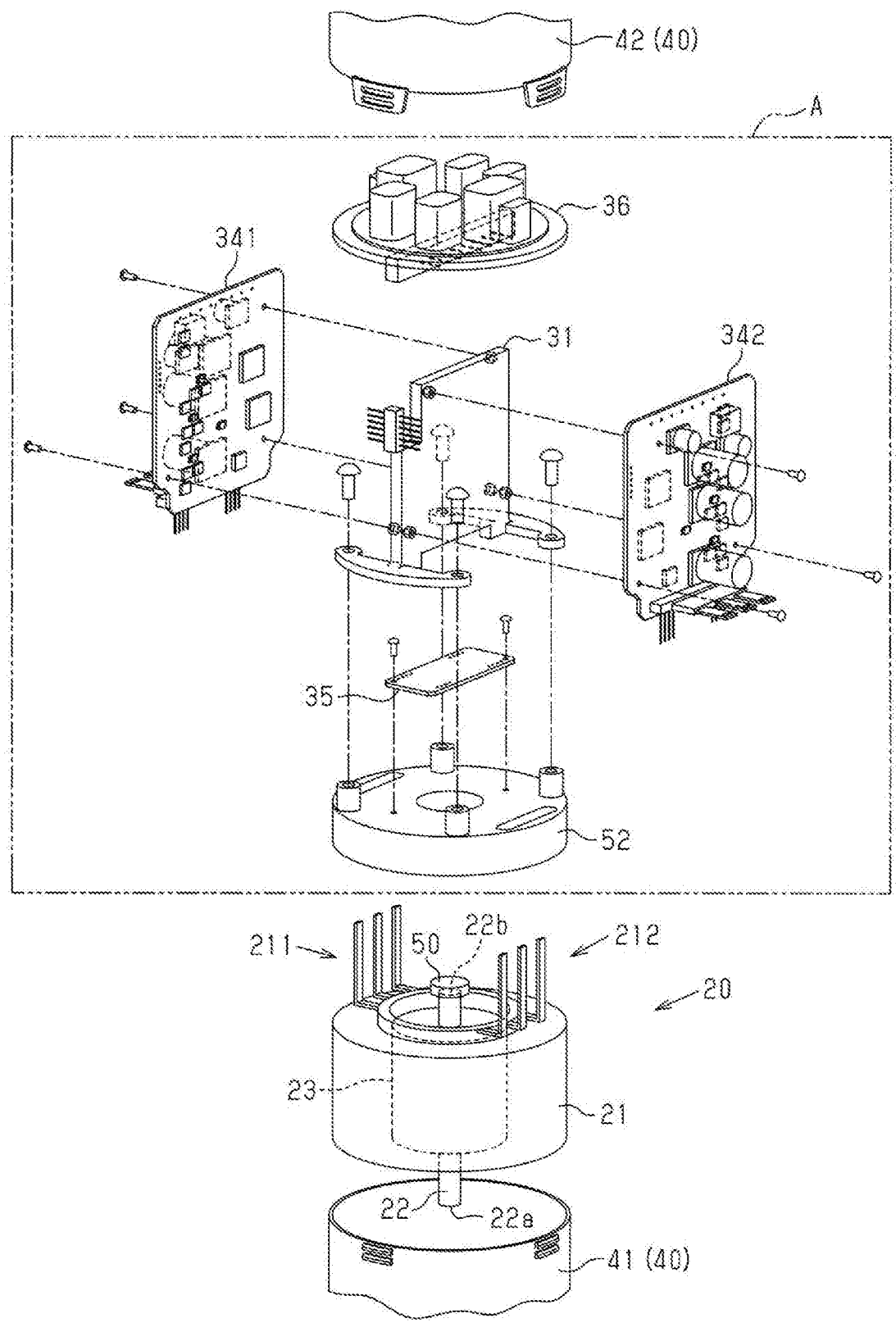
FIG. 2 is an exploded perspective view illustrating the configuration of the motor device.

Specifically, as illustrated in FIG. 2, the motor 20 includes a cylindrical stator 21 having a plurality of teeth. The stator 21 is fixed to the inner peripheral surface of the motor housing 41. Around the teeth of the stator 21, motor coils are wound. The motor coils are connected to a set of three first bus bars 211 or a set of three second bus bars 212 corresponding to three phases (U-phase, V-phase, and W-phase). In the present embodiment, the motor coils are grouped into two systems each consisting of three-phase coils. The motor shaft 22 rotatably supported on the motor housing 41 is disposed on the radially inner side of the stator 21. One end 22a of the motor shaft 22 extends out from the inside of the motor housing 41 (the housing 40) via a through-hole (not illustrated) provided at the bottom of the motor housing 41. A cylindrical rotor 23 is integrally attached to the outer peripheral side of the motor shaft 22. The rotor 23 has a multipolar structure having N-poles and S-poles alternately arranged along the outer peripheral portion thereof.

Figure 4:
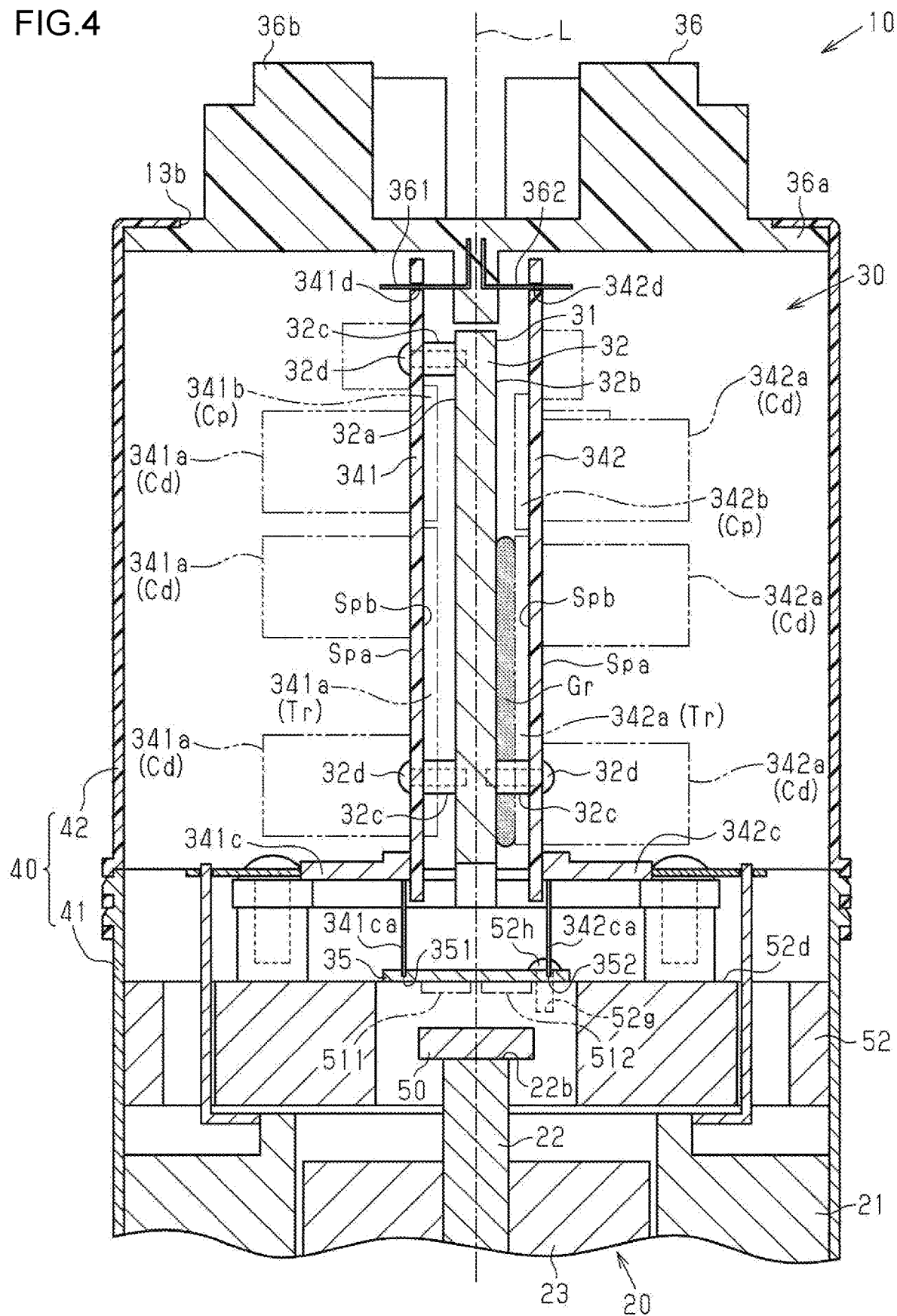
FIG. 4 is a sectional view illustrating the sectional structure taken along the line IV-IV of FIG. 1.

As illustrated in FIGS. 2 and 4, a detection magnet 50 made of a ferromagnetic material is integrally attached to another end 22b on the opposite side of the motor shaft 22 from the one end 22a. The detection magnet 50 is a source of magnetic force that is required to detect the rotational angle of the motor 20 (the rotor 23). A pair of magnetic sensors 511 and 512 facing the detection magnet 50 in the axial direction of the motor shaft 22 detects a change in the magnetic force generated by the detection magnet 50. In the present embodiment, the magnetic sensors 511 and 512 are examples of a detector that detects the rotational angle of the motor shaft 22.

In the motor 20, a three-phase drive electric power corresponding to the rotational angle calculated based on the detection results of the magnetic sensors 511 and 512 is supplied to the motor coils, so that a magnetic field is produced. Then, the rotor 23 rotates based on the relationship between the rotating magnetic field generated in the motor 20 and the magnetic poles.

In the following description, an axial direction refers to a shaft length direction of the motor shaft 22; a radial direction refers to a direction orthogonal to the axial direction (a direction perpendicular to a plane containing the motor shaft 22); and a circumferential direction refers to a rotational direction about the axial direction (a direction in which the motor shaft 22 rotates).

Figure 3:
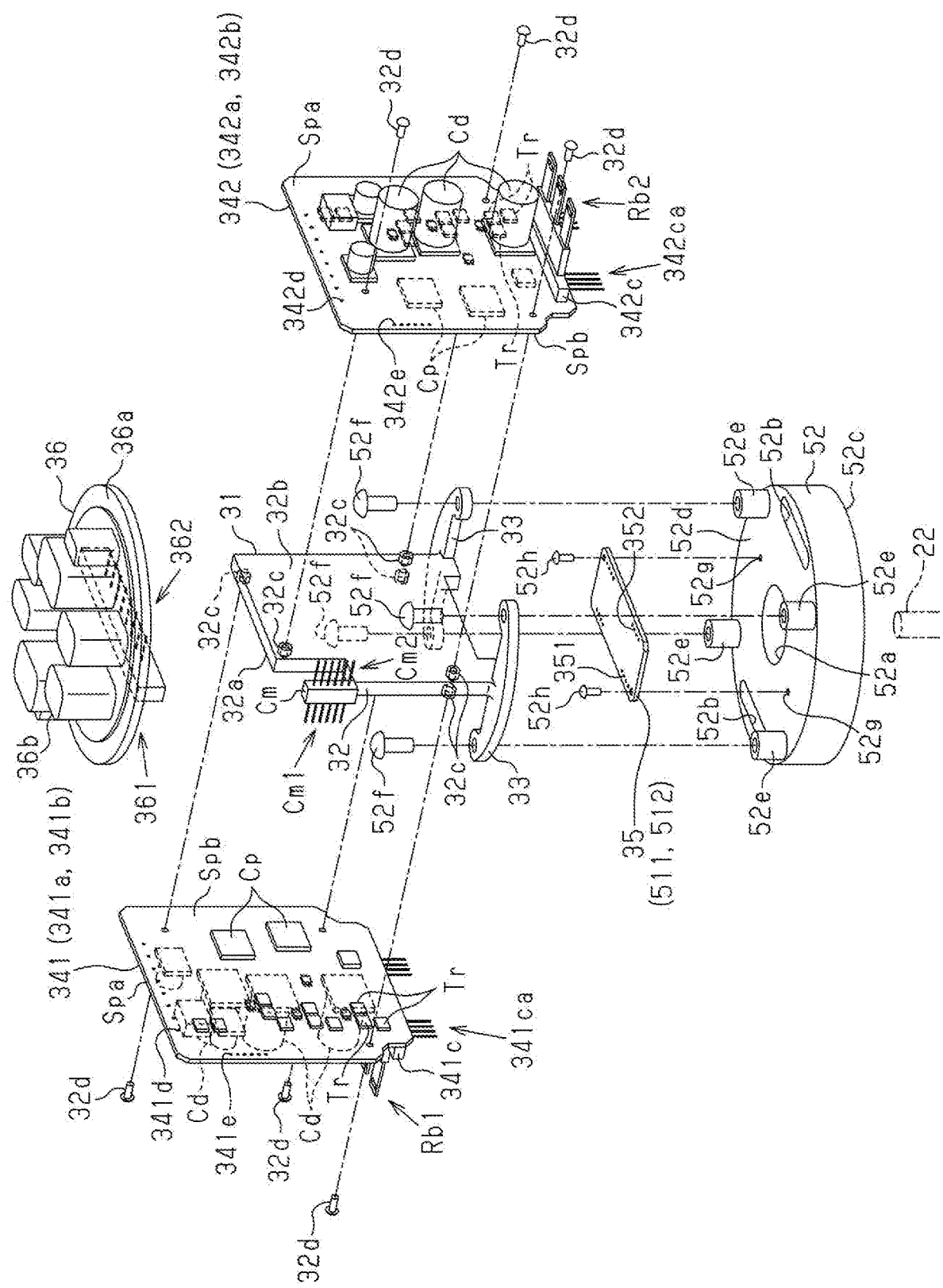
FIG. 3 is an enlarged exploded perspective view illustrating a part A of FIG. 2.

As illustrated in FIGS. 2 and 3, the controller 30 includes a heatsink 31 having a function that promotes heat radiation from the components of the motor device 10. The heatsink 31 is disposed on a disk-shaped rotor housing 52 abutting the motor 20. The rotor housing 52 is fixed to the inner peripheral surface of the motor housing 41 on the other end 22b side of the motor shaft 22. The rotor housing 52 includes a shaft hole 52a having a circular opening to allow communication between the motor 20 side and the controller 30 side separated by the rotor housing 52 in the axial direction, and a pair of bus bar holes 52b each having a rectangular opening. The shaft hole 52a is disposed on the extended line of the motor shaft 22. The other end 22b of the motor shaft 22 is inserted into the shaft hole 52a. The motor shaft 22 is configured such that the detection magnet 50 attached to the other end 22b does not extend out of an end face 52d on the opposite side of the rotor housing 52 from an end face 52c facing the motor 20 in the thickness direction. The pair of bus bar holes 52b is disposed on the radially outer side with respect to the shaft hole 52a. The set of bus bars 211 and the set of bus bars 212 are inserted into the bus bar holes 52b. Each of the bus bars 211 and 212 is configured such that its tip end extending from the stator 21 extends out of the end face 52d of the rotor housing 52.

The heatsink 31 is attached to the end face 52d of the rotor housing 52. The heatsink 31 includes a main body portion 32 having the shape of a rectangular parallelepiped with long sides and short sides, and extending from the end face 52d side of the rotor housing 52. The heatsink 31 further includes a pair of base portions 33 disposed on the rotor housing 52 side of the main body portion 32 to extend on both sides of the main body portion 32 in the thickness direction. Each base portion 33 is fixed to fixing portions 52e, such as bosses, disposed to extend from the end face 52d of the rotor housing 52, by fixing elements 52f, such as screws, at two positions.

Two control boards 341 and 342 are provided on the opposite sides of the main body portion 32 in the thickness direction. Each of the control boards 341 and 342 is included in the controller 30 and is formed in a rectangular flat plate shape with long sides and short sides. The first control board 341 is attached to an end face 32a (on the left side in FIGS. 2 and 3) of the main body portion 32 in the thickness direction. The second control board 342 is attached to an end face 32b (on the right side in FIGS. 2 and 3) on the opposite side of the main body portion 32 from the end face 32a side in the thickness direction. That is, the control boards 341 and 342 are disposed to surround the main body portion 32 from the outer side in the radial direction of the motor 20, while holding the main body portion 32 therebetween from both the end face 32a side and the end face 32b side in the thickness direction.

The following describes the configuration of the pair of control boards 341 and 342. As illustrated in FIG. 3, the first control board 341 forms a circuit that controls driving of the motor 20 via the first system coil connected to the first bus bars 211. On the first control board 341, there are mounted a first power circuit 341a that operates to supply electric power required to drive the motor 20 and a first control circuit 341b that controls operations of the first power circuit 341a.

The second control board 342 forms a circuit that controls driving of the motor 20 via the second coil system connected to the second bus bars 212. On the second control board 342, there are mounted a second power circuit 342a that operates to supply electric power required to drive the motor 20 and a second control circuit 342b that controls operations of the second power circuit 342a.

In the present embodiment, the control boards 341 and 342 are configured to be able to, even when one of the control boards fails or one of the system coil fails, continue driving of the motor 20 via the system coil that is controlled by the other normal control board. That is, the motor device 10 of the present embodiment provides redundancy in controlling driving of the motor 20.

The control boards 341 and 342 have the same configuration and are manufactured through the same manufacturing process. Specifically, each of the power circuits 341a and 342a includes a plurality of electronic components including a plurality of transistors Tr and capacitors Cd that stabilize power supply to the transistors Tr. Each of the control circuits 341b and 342b includes a plurality of electronic components including a plurality of integrated circuits Cp. The surface of an end face of each of the control boards 341 and 342 in the thickness direction is a mounting surface Spa serving as a space for mounting the capacitors Cd. The surface of an end face of each of the control boards 341 and 342 opposite from the mounting surface Spa in the thickness direction is a mounting surface Spb serving as a space for mounting the transistors Tr and the integrated circuits Cp.

On the mounting surface Spa of the first control board 341, there is mounted a first relay circuit 341c that allows electrical connection between the first power circuit 341a and the first bus bars 211 and allows electrical connection between the first control circuit 341b and the first magnetic sensor 511. The first relay circuit 341c includes a set of three first relay bus bars Rb1 allowing electrical connection to the first bus bars 211. The first bus bars 211 are respectively inserted into the first relay bus bars Rb1 and joined by soldering, so that the first relay bus bars Rb1 electrically connect the first control board 341 to the first system coil connected to the first bus bars 211.

Similarly, on the mounting surface Spa of the second control board 342, there is mounted a second relay circuit 342c that allows electrical connection between the second power circuit 342a and the second bus bars 212 and allows electrical connection between the second control circuit 342b and the second magnetic sensor 512. The second relay circuit 342c includes a set of three second relay bus bar Rb2 allowing electrical connection to the second bus bars 212. The second bus bars 212 are respectively inserted into the second relay bus bars Rb2 and joined by soldering, so that the second relay bus bars Rb2 electrically connect the second control board 342 to the second system coil connected to the second bus bars 212.

Further, as illustrated in FIGS. 3 and 4, each of the control boards 341 and 342 is attached to the main body portion 32 to have its long-side direction aligned with the axial direction of the motor 20. Further, each of the control boards 341 and 342 is disposed to have the mounting surfaces Spa and Spb parallel to the axial direction of the motor 20, such that the mounting surfaces Spa and Spb cross the radial direction of the motor 20, while the mounting surface Spb faces the main body portion 32 of the heatsink 31. In this case, on each of the control boards 341 and 342, the transistors Tr as the heat generating sources of each of the power circuits 341a and 342a face the heatsink 31. Each of the control boards 341 and 342 is fixed to fixing portions 32c, such as bosses, disposed to extend from both the end face 32a and the end face 32b of the main body portion 32 in the thickness direction by fixing elements 32d, such as screws, at three positions.

Note that on each mounting surface Spb side (the second control board 342 in the case of FIG. 3), the space from the heatsink 31 is filled with heat radiation grease Gr at the portions corresponding to the transistors Tr. The heat radiation grease Gr transfers heat between the heatsink 31 and the transistors Tr. Accordingly, heat generated from the transistors Tr is transferred to the heatsink 31 via a heat radiation path that passes through the heat radiation grease Gr.

The control boards 341 and 342 are disposed to be rotationally symmetric (two-fold symmetric) about an axis L extending in the axial direction, with respect to the heatsink 31. That is, the control boards 341 and 342 are rotationally symmetric with respect to the heatsink 31 in the circumferential direction of the motor 20, in terms of the arrangement of the electronic components, namely, the transistors Tr, the capacitors Cd, and the integrated circuits Cp included in each of the power circuits 341a and 342a and the control circuits 341b and 342b.

Further, as illustrated in FIGS. 3 and 4, a rotational angle detection board 35 is disposed on the rotor housing side of the main body portion 32. The rotational angle detection board 35 has the paired magnetic sensors 511 and 512 mounted together thereon and is formed in a rectangular flat shape with long sides and short sides. The rotational angle detection board 35 has its thickness direction aligned with the axial direction of the motor 20, and is attached to the rotor housing 52, that is, between the motor 20 and the heatsink 31 in the axial direction. The rotational angle detection board 35 is attached to have its long-side direction aligned with the short-side direction of the control boards 341 and 342, and to face the relay circuits 341c and 342c of the control boards 341 and 342 in the axial direction of the motor 20. On the rotational angle detection board 35, the first magnetic sensor 511 is disposed at the position corresponding to the first relay circuit 341c of the first control board 341. Also, the second magnetic sensor 512 is disposed at the position corresponding to the second relay circuit 342c of the second control board 342. The rotational angle detection board 35 is fixed to mounting holes 52g provided in the end face 52d of the rotor housing 52 by fixing elements 52h, such as screws, at two positions.

Further, the rotational angle detection board 35 includes a plurality of terminal holes 351 and 352 that allow electrical connection to sets of a plurality of terminals 341ca and sets of a plurality of terminals 342ca disposed on the relay circuits 341c and 342c of the control boards 341 and 342, respectively, in the axial direction of the motor 20. The terminals 341ca disposed on the first relay circuit 341c of the first control board 341 are respectively inserted into the terminal holes 351 and joined by soldering, thereby electrically connecting the first control board 341, that is, the first control circuit 341b, and the rotational angle detection board 35, that is, the first magnetic sensor 511. The terminals 342ca disposed on the second relay circuit 342c of the second control board 342 are respectively inserted into the terminal holes 352 and joined by soldering, thereby electrically connecting the second control board 342, that is, the second control circuit 342b, and the rotational angle detection board 35, that is, the second magnetic sensor 512.

Further, as illustrated in FIGS. 3 and 4, a connector portion 36 is disposed on the opposite side of the main body portion 32 from the rotor housing 52, and allows electrical connection of the control boards 341 and 342 to external devices such as a battery and other control devices (not illustrated). The connector portion 36 includes, on the bottom side of the housing cover 42, a disk-shaped base portion 36a fixed to the inner peripheral surface of the housing cover 42, and square tubular connection portions 36b extending out from the inside of the housing cover 42 (the housing 40) via a through-hole 13b provided at the bottom of the housing cover 42.

The connector portion 36 includes a set of multiple terminals 361 and a set of multiple terminals 362 that respectively allow electrical connection to the control boards 341 and 342, between the mounting surfaces Spb of the control boards 341 and 342. The terminals 361 are respectively inserted into a plurality of terminal holes 341d provided in the first control board 341 and joined by soldering, thereby electrically connecting the first control board 341, that is, the first power circuit 341a and the first control circuit 341b, and the connector portion 36. The terminals 362 are respectively inserted into a plurality of terminal holes 342d provided in the second control board 342 and joined by soldering, thereby electrically connecting the second control board 342, that is, the second power circuit 342a and the second control circuit 342b, and the connector portion 36.

Further, as illustrated in FIG. 3, a communication circuit Cm that electrically connects the control circuits 341b and 342b to allow communication therebetween is provided between the mounting surfaces Spb of the control boards 341 and 342. The communication circuit Cm includes a set of multiple terminals Cm1 and a set of multiple terminals Cm2 that respectively allow electrical connection to the control boards 341 and 342, between the mounting surfaces Spb of the control boards 341 and 342. The terminals Cm1 are respectively inserted into a plurality of terminal holes 341e provided in the first control board 341 and joined by soldering, thereby electrically connecting the first control board 341, that is, the first control circuit 341b, and the communication circuit Cm. The terminals Cm2 are respectively inserted into a plurality of terminal holes 342e provided in the second control board 342 and joined by soldering, thereby electrically connecting the second control board 342, that is, the second control circuit 342b, and the communication circuit Cm.

Note that since the control boards 341 and 342 have the same configuration and are manufactured through the same manufacturing process, the first control board 341 includes not only the terminal holes 341e used for joining the terminals Cm1, but also other terminal holes 341e located at the same positions as the terminal holes 342e of the second control board 342 and not used for joining the terminals Cm1. Similarly, the second control board 342 includes not only the terminal holes 342e used for joining the terminals Cm2, but also other terminal holes 342e located at the same positions as the terminal holes 341e of the first control board 341 and not used for joining the terminals Cm2.

The effects of the present embodiment will be described below.

(1) According to the present embodiment, since the control boards 341 and 342 are provided, it is possible to provide redundancy in controlling driving of the motor 20. In this case, the degree of freedom in arrangement is increased compared to the case where combinations of a power circuit and a control circuit are mounted on a single control board, so that the arrangement that prevents an increase in size in the radial direction of the motor 20 can be considered.

Further, as illustrated in FIG. 4, as a result of considering the arrangement of the control boards 341 and 342, the control boards 341 and 342 are disposed parallel to the axial direction of the motor 20. Therefore, it is possible to obtain the effect of minimizing the size in the radial direction of the motor 20, in the arrangement in which the control boards 341 and 342 are disposed to cross the radial direction. Accordingly, it is possible to prevent an increase in the size, or rather reduce the size of the motor device 10 in the radial direction of the motor 20, while providing redundancy in controlling driving of the motor 20.

(2) In the present embodiment, the control boards 341 and 342 are disposed to hold the main body portion 32 of the heatsink 31 therebetween in the thickness direction, and each mounting surface Spb faces the main body portion 32. Therefore, it is possible to share the heatsink 31. This is an effect accompanied with an increase in degree of freedom in arrangement due to provision of the control boards 341 and 342. Accordingly, it is possible to prevent an increase in the size of the motor device 10 in the radial direction of the motor 20, without sacrificing the heat radiation performance of the power circuits 341a and 342a.

(3) In the present embodiment, the control boards 341 and 342 having the same configuration are disposed to be rotationally symmetric about the axis L extending in the axial direction of the motor 20, with respect to the heatsink 31. Accordingly, the electronic components of the control boards 341 and 342 are arranged to be rotationally symmetric with respect to the heatsink 31 in the circumferential direction of the motor 20. In this case, the heat generated by the power circuits 341a and 342a, that is, the transistors Tr is uniformly distributed on the heatsink 31. This allows the heat radiation performance of the power circuits 341a and 342a to be uniformly allocated between the control boards 341 and 342. Accordingly, it is possible to improve the heat radiation performance of the power circuits 341a and 342a, while preventing an increase in the size of the motor device 10 in the radial direction of the motor 20. Further, in the case where the control boards 341 and 342 are manufactured through the same manufacturing process, it is possible to use a common design for the control boards 341 and 342. This is effective in improving the productivity.

(4) In the present embodiment, the rotational angle detection board 35 is disposed between the motor 20 and the heatsink 31 in the axial direction of the motor 20. Therefore, although the motor shaft 22 needs to be extended in the axial direction for detection of the rotational angle of the motor shaft 22, the length that is extended in the axial direction can be minimized. Accordingly, it is possible to reduce the size of the motor device 10 in both the radial direction and the axial direction of the motor 20. In this case, it is possible to minimize the length of the motor shaft 22 that is extended in the axial direction for detection of the rotational angle of the motor shaft 22. This is effective in ensuring the detection accuracy of the rotational angle of the motor shaft 22.

The embodiment described above may be implemented in the following modes to which modifications are applied. The rotational angle detection board 35 may be disposed between the heatsink 31 and the connector portion 36, in the axial direction of the motor 20. In this case, to detect the rotational angle of the motor shaft 22, the motor shaft 22 may be extended in the axial direction to reach near the connector portion 36.

The rotational angle detection board 35 may be a pair of rotational angle detection boards corresponding to the control boards 341 and 342. Each of the magnetic sensors 511 and 512 may be a sensor using a Hall IC or the like. Further, a resolver may be used to detect the rotational angle of the motor 20.

The control boards 341 and 342 do not need to have the same configuration, and may differ in the type of the electronic components, and the arrangement of the electronic components. For example, in the case where the heat radiation performance differs between the end faces 32a and 32b of the main body portion 32 of the heatsink 31, it is effective to use the configuration of this modification.

The control boards 341 and 342 (the mounting surfaces Spa and Spb) only need to extend unparallel to the radial direction of the motor 20. Thus, when the control boards 341 and 342 are inclined even a little with respect to the radial direction, the effect of preventing an increase in size in the radial direction of the motor 20 can be obtained, even if the control boards 341 and 342 are not parallel to the axial direction of the motor 20.

In the control boards 341 and 342, the mounting surfaces Spa and Spb may have the configuration on at least one side. That is, the plurality of electronic components may be all mounted on one of the two end faces in each of the control boards 341 and 342.

As long as it is possible to prevent an increase in size in the radial direction of the motor 20, each of the control boards 341 and 342 may be attached such that the short-side direction thereof is aligned with the axial direction of the motor 20, or may be formed in a flat plate shape with four sides of the same length.

As long as the control boards 341 and 342 are disposed parallel to the axial direction of the motor 20, the effect of reducing the size in the radial direction of the motor 20 can be obtained. For example, the mounting surface sides of the control boards 341 and 342 facing the heatsink 31 may differ. Further, for example, the main body portion 32 of the heatsink 31 is configured to have a space for installing the control boards 341 and 342 in the width direction, so that the control boards 341 and 342 are attached in the thickness direction and the width direction of the main body portion 32 so as to be adjacent in the circumferential direction of the main body portion 32.

The motor device 10 may use a cooling structure such as, for example, air cooling structure using an air sending device (fan) in place of the heatsink 31. That is, the main body portion 32 only needs to have the function of attaching the control boards 341 and 342, and does not need to have a function of radiating heat.

For providing redundancy in controlling driving of the motor 20, the control boards 341 and 342 corresponding to the two system coils are provided. However, three or four or more control boards corresponding to three or four or more system coils may be provided. In this case, the three control boards and the four control boards are arranged to be three-fold symmetric and four-fold symmetric, respectively.

Note that, as a way of providing redundancy, the control boards 341 and 342 are switched therebetween to control driving of the motor 20, via a single system coil. The same applies to the case where three or four or more control boards are provided. Further, in the case where three or four or more control boards are provided, the main body portion 32 of the heatsink 31 may be configured to have a space for installing the control boards in the width direction as described above.

In the housing 40, the housing cover 42 is made of a metal material such as aluminum. The above embodiment may be implemented not only as a motor device mounted on an electric power steering system, but also as a motor device mounted on a drive device that drives the wheels.

The modifications described above may be applied in combination. For example, the feature "the housing cover 42 is made of a metal material such as aluminum" and one or more features of the other modifications may be applied in combination.

What is claimed is:

1. A motor device comprising:
    a motor including a motor shaft;
    a plurality of control boards each having a power circuit that operates to supply electric power required to drive the motor, and each having a power control circuit that controls operations of the power circuit, the power circuit and the power control circuit forming a circuit that controls driving of the motor, wherein the circuit includes a plurality of circuit components; and
    a housing that accommodates the motor and the control boards together, wherein
    each of the control boards has a surface, wherein the plurality of circuit components are attached on the surface, and each of the control boards is disposed so that the surface crosses a radial direction that is orthogonal to an axial direction of the motor.

2. The motor device according to claim 1, wherein the control boards are disposed parallel to the axial direction of the motor.

3. The motor device according to claim 1, further comprising:
    a heatsink that promotes heat transfer from the power circuits, wherein
    the control boards are disposed to hold the heatsink between the control boards from an outer side in the radial direction of the motor, and such that a side of each of the control boards on which the power circuit and the power control circuit are mounted faces the heatsink.

4. The motor device according to claim 3, wherein the control boards have a same configuration, and are disposed to be rotationally symmetric about an axis extending in the axial direction of the motor, with respect to the heatsink.

5. The motor device according to claim 3, further comprising:
    a rotational angle detection board having a plurality of detectors that detect a rotational angle of the motor shaft based on a state quantity that changes in accordance with a rotation operation of the motor and that are respectively used in combination with the control boards, wherein
    the rotational angle detection board is disposed between the motor and the heatsink in the axial direction of the motor.

6. The motor device according to claim 1, further comprising
    a heatsink that promotes heat transfer from the power circuits and includes one main body portion, and base portions that extend from the one main body portion and connect the heatsink to the motor.

7. The motor device according to claim 6, wherein the one main body portion is between and parallel to two of the plurality of control boards.

8. The motor device according to claim 7, wherein the one main body portion lies on a central axis of the motor.

9. The motor device according to claim 6, wherein each of the base portions extend away from opposed sides of the one main portion.

10. The motor device according to claim 6, wherein the one main portion is a rectangular parallelepiped.

11. The motor device according to claim 1, further comprising
    a heatsink with one main body portion, wherein two of the plurality of control boards are on opposite sides of, and sandwich, the main body portion.

12. The motor device according to claim 11, wherein a central longitudinal axis of the one main body lies on a line with a central axis of the motor.

* * * * *